United States Patent
Arya et al.

(10) Patent No.: US 10,530,873 B1
(45) Date of Patent: Jan. 7, 2020

(54) TECHNIQUES FOR OPTIMIZING EVPN-IRB FOR IPV6-ENABLED DATA CENTERS WITH TOP-OF-RACK DEPLOYMENTS

(71) Applicant: CISCO TECHNOLOGY, INC., San Jose, CA (US)

(72) Inventors: Ravi Arya, Fremont, CA (US);
Srinivas Ramprasad, Bangalore (IN);
Neeraj Malhotra, Los Gatos, CA (US);
Balaji Kanthasamy, Tirunelveli (IN);
Kishore Karthikeyan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 77 days.

(21) Appl. No.: 15/582,149

(22) Filed: Apr. 28, 2017

(51) Int. Cl.
*H04L 29/08* (2006.01)
*H04L 12/46* (2006.01)
*H04L 12/44* (2006.01)

(52) U.S. Cl.
CPC .............. *H04L 67/16* (2013.01); *H04L 12/44* (2013.01); *H04L 12/4641* (2013.01); *H04L 67/2842* (2013.01)

(58) Field of Classification Search
CPC ..... H04L 67/16; H04L 67/2842; H04L 12/44; H04L 12/4641
See application file for complete search history.

(56) References Cited

U.S. PATENT DOCUMENTS

| | | | |
|---|---|---|---|
| 9,838,241 B2 * | 12/2017 | Hartley | H04L 29/08648 |
| 2012/0151085 A1 | 6/2012 | Singh et al. | |
| 2013/0034057 A1 * | 2/2013 | Aramoto | H04W 36/0011 370/328 |
| 2014/0036989 A1 | 2/2014 | Heinrich et al. | |
| 2014/0059192 A1 | 2/2014 | Miklós | |
| 2015/0085696 A1 | 3/2015 | Guo et al. | |
| 2015/0222474 A1 * | 8/2015 | Hartley | H04L 29/08648 370/338 |
| 2016/0174148 A1 | 6/2016 | Seed et al. | |
| 2016/0380882 A1 * | 12/2016 | Thomas | H04L 45/26 370/401 |
| 2017/0195210 A1 * | 7/2017 | Jacob | H04L 12/4625 |
| 2017/0339048 A1 * | 11/2017 | Thomas | H04H 20/20 |
| 2018/0183706 A1 * | 6/2018 | Przygienda | H04L 45/32 |

OTHER PUBLICATIONS

Narten, T., et al., "Neighbor Discovery for IP version 6 (IPv6)," Network Working Group, RFC 4861, Sep. 2007, 97 pages; https://tools.ietf.org/pdf/rfc4861.pdf.
Sajassi, et al., "BGP MPLS-Based Ethernet VPN," Standards Track, Internet Engineering Task Force, Feb. 2015, p. 1-56.

* cited by examiner

*Primary Examiner* — Davoud A Zand

(57) ABSTRACT

A method is described and in one embodiment includes receiving at a network node of an Ethernet Virtual Private Network ("EVPN") an unsolicited neighbor discovery ("ND") neighbor advertisement ("NA") message transmitted on behalf of a host; updating an ND cache of the network node with data included in the ND NA message; syncing the received ND NA message to a multihoming peer of the network node; and advertising by the network node the ND NA message to other nodes in the EVPN.

20 Claims, 6 Drawing Sheets

TECHNIQUES FOR OPTIMIZING EVPN-IRB FOR IPV6-ENABLED DATA CENTERS WITH TOP-OF-RACK DEPLOYMENTS

TECHNICAL FIELD

This disclosure relates in general to the field of computer networking and, more particularly, to techniques for optimizing Ethernet Virtual Private Network ("EVPN")-Integrated Routing and Bridging ("IRB") for IPv6-enabled data centers with top-of-rack ("ToR") deployments.

BACKGROUND

The creation of virtual networks using overlays has become a pervasive practice in the networking space. The industry offers diverse, and often incompatible, solutions. There are mainly two categories of solutions based on the control plane model employed: controller-based and protocol-based. Controller-based solutions employ a central database from which host reachability information is pushed to tunnel end-points of a virtual network. Examples of controller-based solutions include, for example, Cisco Virtual Topology System ("VTS") and VMware NSX virtual networking solutions and their use of OVSDB and OpenFlow with its vendor-specific extensions. Protocol-based solutions employ a distributed model in which all involved network elements participate in a well understood protocol to calculate and disseminate the relevant reachability information. Examples of protocol-based solutions include, for example, BGP-EVPN overlays and LISP Overlays. Controller-based and protocol-based solutions are inherently incompatible due to the manner in which each distributes reachability and data plane encapsulation capability information.

MAC/IP routes need to be learned for EVPN. EVPN solutions require MAC/IP routes (also referred to as EVPN Type 2 routes or "RT-2") to be learned as soon as possible to advertise/establish reachability for connected hosts. Additionally, for host virtual machines ("VMs") multi-homed via a Multi-Chassis Link Aggregation Group ("MC-LAG") interface to redundant ToR switches that act as first hop IRB gateways between the MC-LAG access and an EVPN-Multiprotocol Label Switching ("MPLS") overlay network, host VM layer 3 ("L3") adjacency (learned on the IRB L3 interface) and host VM MAC (learned on the access LAG) must be synced across redundant ToR switches in order to achieve optimal all-active multi-homing with overlay Equal Cost Multipath ("ECMP") paths and local switching.

This MAC+IPV6 L3 adjacency sync and MAC sync are accomplished via special handling of received EVPN MAC+IPV6 RT-2 advertisement pertaining to a dual-homed host. This special handling identifies the received RT-2 to be that on a locally connected Ethernet Segment Identifier ("ESI") and as a result, creates a synced local adjacency and a synced local MAC entry for the dual-homed (or multi-homed) host in the event that the host has not been learned dynamically via IPV6 neighbor discovery ("ND") protocol. This enables redundant IRB gateway ("IRG-GW") ToR switches to be able to forward routed and bridged traffic directly towards a locally connected host irrespective of which of the redundant ToR switches learned the ND entry and MAC natively, and hence provide optimal ECMP forwarding paths to a host over EVPN overlay.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is described and in one embodiment includes receiving at a network node of an Ethernet Virtual Private Network ("EVPN") an unsolicited neighbor discovery ("ND") neighbor advertisement ("NA") message transmitted on behalf of a host; updating an ND cache of the network node with data included in the ND NA message; syncing the received ND NA message to a multihoming peer of the network node; and advertising by the network node the ND NA message to other nodes in the EVPN. In certain embodiments, the network node is implemented as a Top of Rack ("ToR") switch. In some embodiments, the data included in the ND NA message includes IP to MAC binding information for the host. The updating may include updating an entry in the ND cache corresponding to the host.

In some embodiments, the ND NA message is originated by the host during an initiation process of the host in connection with the EVPN. In other embodiments, the ND NA message is originated by the host in response to receipt of an ND Neighbor Solicitation ("NS") message to the host on behalf of another host in a stretched subnet to which the host belongs. In still other embodiments, the ND NA message is originated by the host in response to receipt of an ND Neighbor Sonication ("NS") message received from the multihoming peer of the network node. The syncing may include adding to the ND cache of the multihoming peer an entry corresponding to the host with a sync flag set.

Example Embodiments

Figure 1:
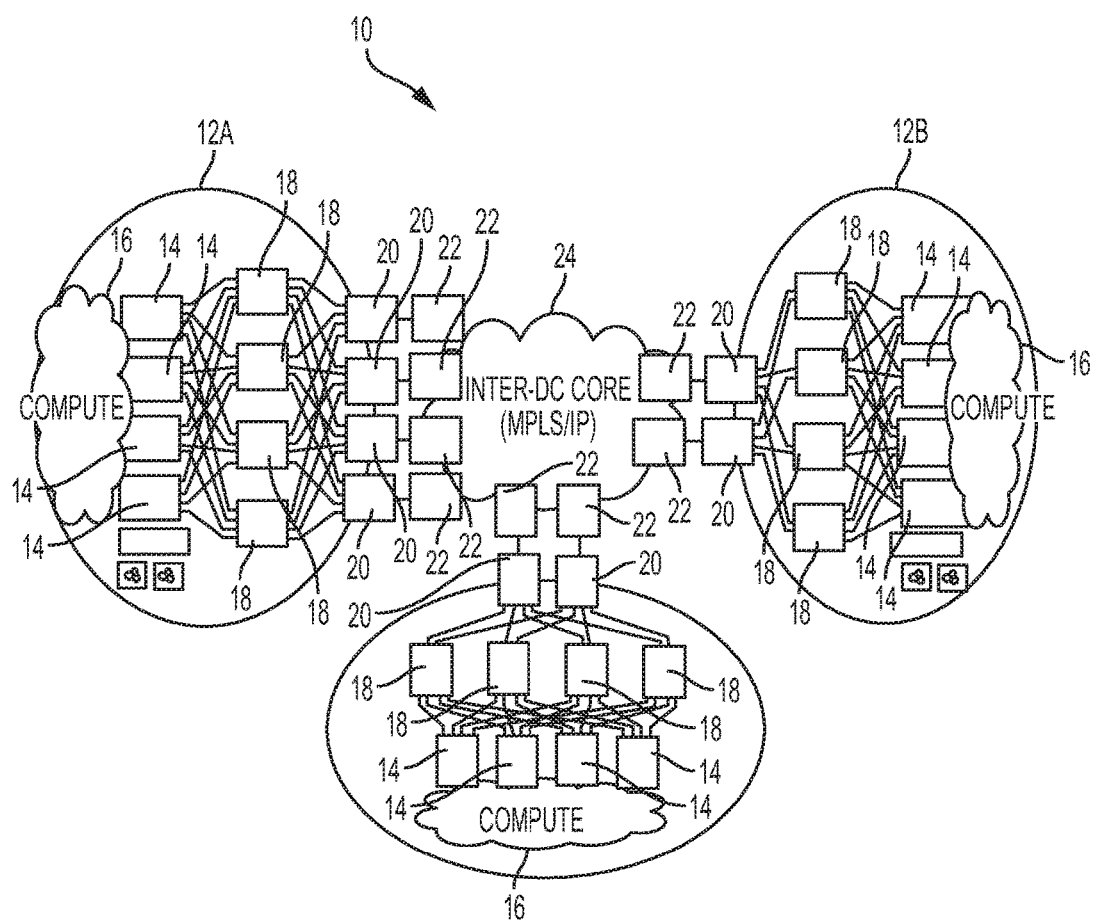
FIG. 1 is a simplified block diagram of a data communications environment including features of embodiments described herein for optimizing EVPN-IRB for IPv6-enabled data centers with ToR deployments.

Referring now to FIG. 1, illustrated therein is a simplified block diagram of an example communications system 10 in accordance with embodiments described herein. In the embodiment shown in FIG. 1, the system 10 comprises a plurality of Data Fabric Architecture ("DFA") fabrics, respectively designated by reference numerals 12A, 12B, and 12C. In one embodiment, the fabrics 12A-12C are geographically dispersed. For example, fabric 12A may be located in Washington, D.C., fabric 12B may be located in Mumbai, India, and fabric 12C may be located in Beijing, China. In other embodiments, one or more of the fabrics 12A-12C may be located in the same geographic area. Each of the fabrics 12A-12C comprises a plurality of leaf nodes 14, which in certain embodiments comprise network switching or routing elements. The leaf nodes 14 of each fabric 12A-12C connect to a respective compute network 16, each comprising a plurality of servers for hosting virtual machines ("VMs") or physical servers. Each of the leaf nodes 14 is connected to each of a plurality of spine nodes 18.

As previously noted, the leaf nodes 14 may be implemented as switching elements, such as Top of Rack ("ToR") switches, which may be located in a rack unit (not shown) that houses one or more network compute elements, such as physical servers, collectively represented in FIG. 1 by compute network 16. Each leaf node is connected to each of the spine nodes, which may be implemented using routers or switches, and is configured to route communications between the physical servers comprising the compute element in the rack unit and other network elements. Although not shown, it will be recognized that each of the physical servers of the compute network 16 may have instantiated thereon one or more virtual switches for hosting virtual machines ("VMs"). Virtual switches and VMs may be created and run on each physical server on top of a hypervisor installed on the server. Each virtual switch may be configured to manage communications of VMs in particular virtual networks and/or subnetworks ("subnets"). Virtual switches may be embodied as software stored and executed on the corresponding physical server. Thus, the virtual switch performs functions of a physical switch device. Similarly, each VM may comprise software stored and executed on the corresponding physical server. The VMs are configured to exchange communications with other VMs via the system 10. It may be appreciated that any number of physical servers hosting any number of virtual switches and VMs may be present in the system 10. In addition, as previously noted, compute network 16 may include only bare blade/physical servers and may be devoid of VMs.

Referring again to leaf nodes 14, each leaf node is responsible for managing communications (e.g., routing and forwarding) originating from and destined for compute node to which it is connected. Leaf nodes 14 may be used to provide redundancy and fault-tolerance for communications associated with physical servers, virtual machines and virtual switches in the rack. As stated above, physical servers of the compute network 16 host VMs. VMs may exchange communications (e.g. data packets) with other VMs in the system 10 via leaf nodes. Each VM is a member of a tenant network, which is a unique L3 subnet that may contain one or more VLANs. For example, a tenant "Company A" may have two tiers/tenant networks; namely 1.1.1.0/24 and 2.2.2.0/24. A tenant network, or subnet, can span multiple VLANs. As the tenant network of which VM is a member, it may be provisioned with certain network attributes in order to exchange data packets. For example, upon instantiation, a tenant network and a VM therein may be provisioned with virtual network segmentation resources, for example the VM and tenant network may be associated with one or more virtual Local Area Network (VLAN) identifiers, and a subnet identifier. In one example, virtual network segmentation resources may be provisioned on a per-switch or per-port basis (e.g., up to four thousand VLANs per switch or four thousand per port of a switch). Thus, when a tenant network and VM therein are created, a ToR switch may select an unused VLAN for a given segmentation assignment. The virtual segmentation resources may also include a Switch Virtual Interface ("SVI") assignment, an Access Control List ("ACL") assignment, a Quality of Service ("QoS") assignment, a Virtual Routing and Forwarding ("VRF") assignment, etc. It may be appreciated that other network information now known or heretofore contemplated may also be assigned to the VM. Each tenant network is also associated with a segment identifier (segment ID), which is used to uniquely identify the tenant network in a particular fabric.

Referring again to FIG. 1, in accordance with features of embodiments described herein, each of the fabrics 12A-12C includes one or more border leaf ("BL") nodes 20, each of which is connected to a Data Center Interconnect ("DCI") node 22. Although the BL/DCI node combinations illustrated in FIG. 1 as comprising separate nodes 20 and 22, in some embodiments, the BL/DCI functionality may be integrated into a single device, or node. The DCI nodes 22 connect their respective fabrics 12A-12C to an inter-data-center core, which may be an MPLS/IP network, 24.

Embodiments described herein optimize EVPN-IRB for IPv6-enabled data center networks with ToR switch deployments. It will be recognized that IPv6 Neighbor Discovery ("ND") process will only learn from a neighbor if a "Neighbor Solicitation ("NS") message targeted for the ToR switch IP address arrives from a host VM or if a solicited "Neighbor Advertisement" ("NA") message arrives in response to an NS message sent by a ToR switch. This situation may lead to scenarios in which the ToR switch might not learn about a host connected to the switch and therefore not advertise the MAC-IPV6 route for that host to the network. This may occur, for example, when a host is attempting to resolve a neighbor entry for a host on the same subnet IP but connected to a different ToR switch. Another scenario in which this may occur is one in which a subnet is stretched across multiple ToR routers or switches using a distributed anycast GW, in which case an NS may be originated by a first ToR node, but the reply (NA) may be processed by a different ToR node.

In summary, in network topologies in which subnets are stretched or multi-homed, the subnet L3 GW on the ToR node is configured with the same GW IP and MAC address. As a result, a unicast NA in response to a multi-cast NS may be processed at any ToR node that is part of the distributed anycast GW for the subnet (by virtue of having the same GW MAC and IP).

On a ToR switch that learned a host MAC-IPV6 dynamically via IPV6 ND, during a periodic IPV6 ND refresh for the dynamically learned neighbor entry, it is possible for IPV6 ND reply from host to arrive at one of the other ToR switches. In the event that IPV6 ND reply arrives at the other ToR switch, the dynamically learned IPV6 ND entry on the ToR switch soliciting an ND refresh would timeout and be deleted, resulting in temporary traffic black hole until this ND entry is relearned at one of the ToR switches and synced to the other ToR switch.

As defined in greater detail in IETF RFC 4861, IPv6 ND protocol may be used by network nodes (e.g., hosts, routers, switches) to determine link layer addresses for neighbors known to reside on attached links and to quickly purge cached values that become invalid. Hosts may also use ND protocol to find neighboring routers/switches that are willing to forward packets on behalf of the host. Finally, nodes may use the protocol to actively track which neighbors are reachable and to detect changed link layer addresses. When a router or the path to a router fails, a host actively searches for functioning alternates.

ND protocol defines a number of different packet types, including a pair of Neighbor Solicitation ("NS") and Neighbor Advertisements ("NA") messages, which serve the following purposes. In particular, an NS message is sent by a node to determine the link layer address of a neighbor or to verify that a neighbor is still reachable at a cached link layer address. An NA message is a response to an NS message. A node may also send unsolicited NA messages to announce a link layer address change. Nodes accomplish address resolution by multicasting an NS message that asks the target node to return its link layer address. NS messages are multicast to the solicited node multicast address of the target address. The target returns its link layer address in a unicast NA message. A single request-response pair of packets is sufficient for both the initiator and the target to resolve each other's link layer addresses, as the initiator includes its link layer address in the NS message.

As previously noted, nodes send NS messages to request the link layer address of a target node while also providing their own link layer address to the target node. NS messages are multicast when the node needs to resolve an address and unicast when the node seeks to verify the reachability of a neighbor. Nodes send NA messages in response to NS messages. Nodes may also send unsolicited NA messages in order to propagate new information quickly.

For each interface, a host maintains a neighbor cache, which includes a set of entries about individual neighbors to which traffic has recently been sent. Entries are keyed on the neighbor's on-link unicast IP address and contain such information as its link layer address, a flag indicating whether the neighbor is a router or a host, etc.

When a node has a unicast packet to send to a neighbor, but does not know the neighbor's link-layer address, it performs address resolution. For multicast-capable interfaces, this entails creating a neighbor cache entry in an INCOMPLETE state and transmitting an NS message targeted at the neighbor. The solicitation is sent to the solicited-node multicast address corresponding to the target address.

A node sends an NA message in response to a valid NS message targeting one of the node's assigned addresses. In some cases (e.g., during host initiation), a node may be able to determine that its link layer address has changed and may wish to inform its neighbors of the new link layer address quickly with an unsolicited NA message.

Figure 2:
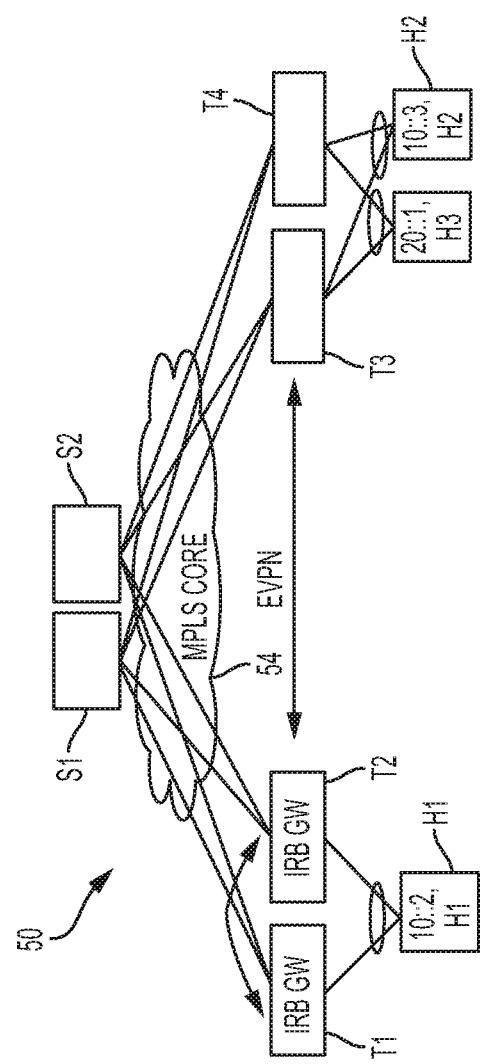
FIG. 2 is another simplified block diagram of a data communications environment including features of embodiments described herein for optimizing EVPN-IRB for IPv6-enabled data centers with ToR deployments.

Referring now to FIG. 2, illustrated therein is a simplified block diagram of an example communications environment 50 in accordance with embodiments described herein for optimizing EVPN-IRB for IPv6-enabled data center networks with ToR switch deployments. As shown in FIG. 2, the environment 50 includes a plurality of ToR switches, represented in FIG. 2 by ToR switches T1, T2, T3, and T4, two of which (ToR switches T1 and T2) comprise IRB Gateways ("IRB GWs"). The environment 50 further includes a plurality of hosts, represented in FIG. 2 by hosts H1, H2, and H3, which are advertised in an EVPN segment comprising ToR switches T1-T4. In the illustrated embodiment, host H1 is multihomed to ToR switches T1 and T2 and NA/NS messages from host H1 are sent to one of the ToR switches T1, T2, based on hashing. Similarly, host H2, which is on the same subnet as host H1, is multihomed to ToR switches T3 and T4 and NA/NS messages from host H2 are sent to one of the ToR switches T3, T4, based on hashing. ToR switches T1-T4 are connected to an MPLS core 54 comprising a plurality of switches, represented in FIG. 2 by switches S1, S2.

Figure 3:
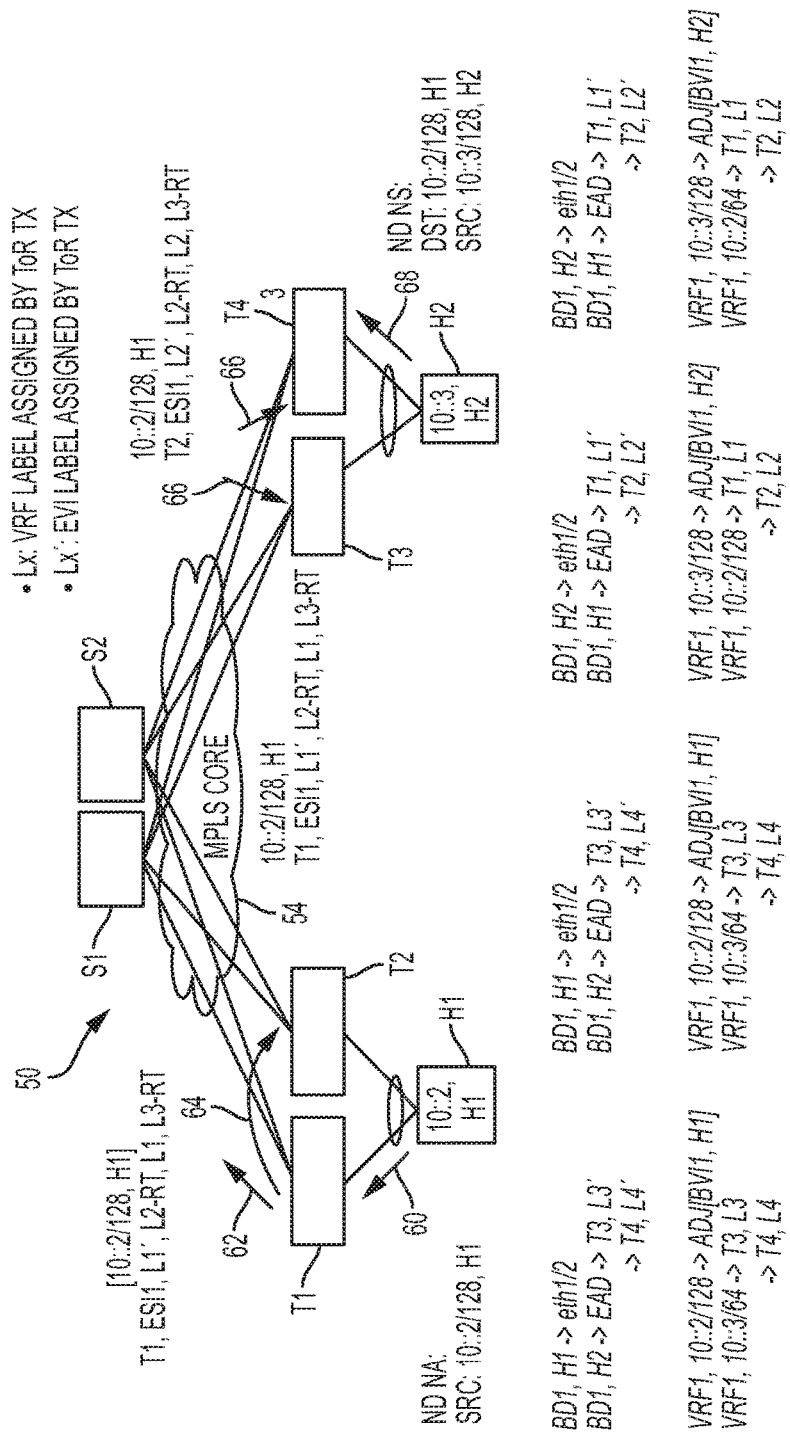
FIG. 3 is another simplified block diagram of the data communications environment including features of embodiments described herein for optimizing EVPN-IRB for IPv6-enabled data centers with ToR deployments.

Referring now to FIG. 3, illustrated therein is a more detailed block diagram of the example communications environment 50. Referring to FIG. 3, in accordance with features of embodiments describe herein for processing unsolicited NA/NS and syncing to the multi-homed peer in EVPN, when host H1 comes up, it sends an NA message registering its presence to one of ToR switches T1, T2 (based on hashing). It will be assumed for the sake of example herein that ToR switch T1 is selected based on the hashing to receive the unsolicited NA message from host H1, as represented in FIG. 3 by an arrow 60. Under RFC 4861, the unsolicited NA message from host H1 would normally be rejected by ToR switch T1; however, in accordance with features of embodiments described herein, the ToR switch T1 processes the unsolicited NA message and adds the host IP to MAC binding information included therein regarding host H1 to a corresponding ND cache entry for the host H1. Next, the ToR switch T1 advertises the host H1 to EVPN segment, as represented by an arrow 62, and syncs the information to the multi-homed peer ToR switch T2, as represented by an arrow 64. As represented by arrows 66, ToR switches T3 and T4 will install the IP and MAC routes via T1/T2. It will be noted that this cached information could be subsequently used to respond to host H2 when it sends an NS message for host H1, as represented by an arrow 68. As a result of the embodiment illustrated in FIG. 3, host H1 discovery is accomplished at ToR switches T1 and T2 through processing of an unsolicited NA message received from the host H1 during host initiation.

Additionally, the ND NS (arrow 68) may be a non-targeted NS that is processed and the host H2 learned therefrom. In particular, the non-targeted NS multicast packet is directed at ToR node T4. ToR node T4 may process the request, learn about the host H2, and advertise the host H2 to the EVPN.

Figure 4:
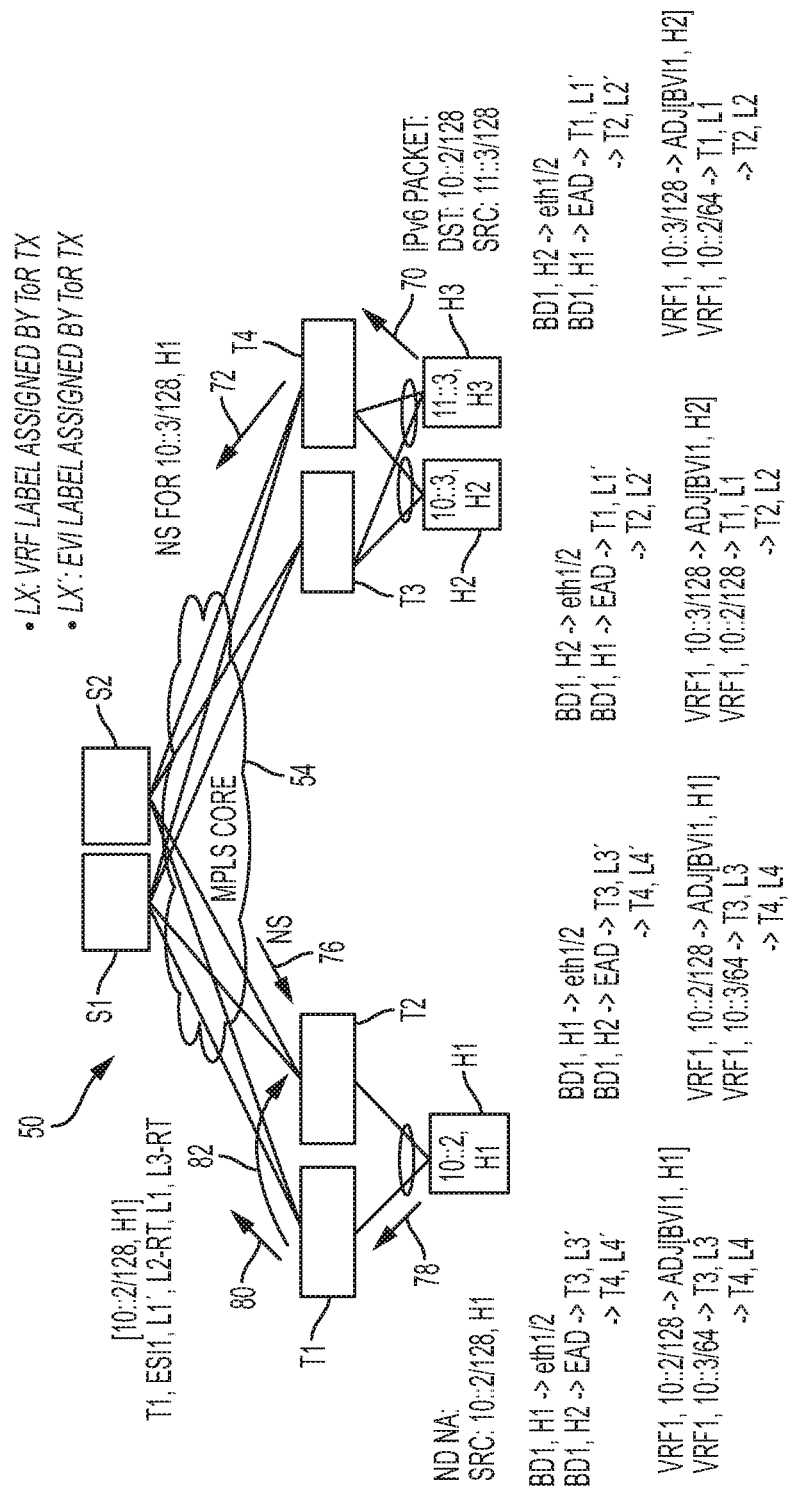
FIG. 4 is another simplified block diagram of a data communications environment including features of embodiments described herein for optimizing EVPN-IRB for IPv6-enabled data centers with ToR deployments.

Referring now to FIG. 4, illustrated therein is another detailed block diagram of the example communications environment 50. Referring to FIG. 4, in accordance with features of embodiments described herein for processing unsolicited NAs in response to an NS message to a stretched subnet endpoint, host H3 sends a data packet with a destination IP address of H1, which is located in a different subnet, to its default GW MAC (distributed across ToR nodes T1, T2, T3, and T4, as represented by an arrow 70. As used herein, the phrase "stretched subnet" refers to an IP subnet on a VLAN that is stretched across multiple ToR nodes with MAC reachability within the VLAN distributed via BGP EVPN. The default GW ToR node T3 or T4 (selected based on hashing) originates an NS for H1 because H1's subnet is local to ToR nodes T1/T2 via the MPLS core 54, as represented by an arrow 72. Upon receipt of the NS message, as represented in FIG. 4 by an arrow 76, host H1 sends an NA message in response to the NS message, as represented in FIG. 4 by an arrow 78. Assuming ToR switch T1 is selected to receive the NS message from the host H1, ToR switch T1 processes the unsolicited NA message, learns the host H1, advertises the host H1 to the EVPN, as represented by an arrow 80, and syncs the information to the multi-homed peer ToR switch T2 as the multihomed peer, as represented by an arrow 82. As a result of the embodiment illustrated in FIG. 4, host H1 discovery is accomplished at ToRs switches T1 and T2 through processing of an unsolicited NA message received at one of the ToR switches T1/T2 and synced to the peer ToR switch in response to an NS message from another node across a stretched subnet.

Figure 5A:
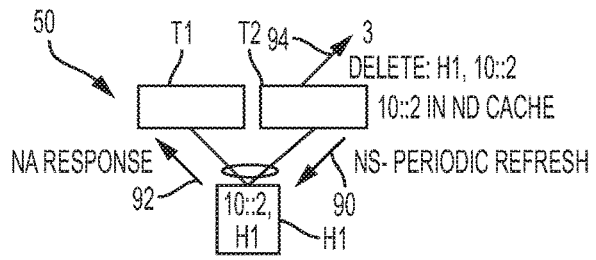
FIGS. 5A and 5B collectively illustrate another simplified block diagram of a data communications environment including features of embodiments described herein for optimizing EVPN-IRB for IPv6-enabled data centers with ToR deployments.
Figure 5B:
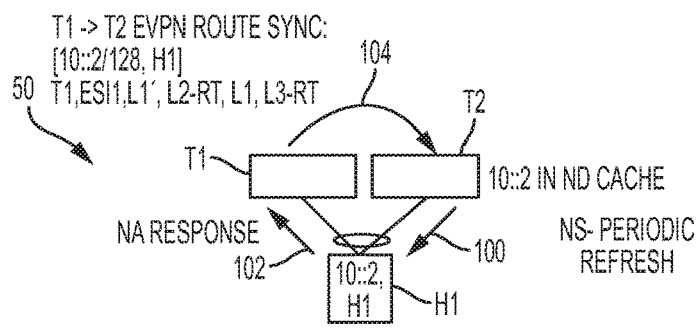

FIGS. 5A and 5B each illustrate a block diagram showing a portion of the example communications environment 50. In particular, FIGS. 5A and 5B collectively illustrate a scenario in which embodiments described herein may be used to implement a syncing mechanism between multi-homed ToR peers to avoid traffic "black holes" in the environment 50. Referring to FIG. 5A, without the syncing mechanism, when host H1 (which is already in the ND cache of ToR switch T2) receives a periodic refresh NS message from ToR switch T2, as represented by an arrow 90, due to the multi-homing hash mechanism, host H1 may send an NA response message to ToR switch T1 instead of to ToR switch T2, as represented by an arrow 92. As a result, upon expiration of a refresh timeout period at ToR switch T2 without receipt of an NA response message from host H1, ToR switch T2 will delete the ND cache entry for host H1 and will send withdrawal notifications to the EVPN segment indicating that the host H1 is dead, as represented in FIG. 5A by an arrow 94.

In contrast, referring to FIG. 5B, in which a syncing mechanism in accordance with embodiments described herein is implemented, when host H1 (which is already in the ND cache of ToR switch T2) receives a periodic refresh NS message from ToR switch T2, as represented by an arrow 100, due to the multi-homing hash mechanism, host H1 may send an NA response message to ToR switch T1 instead of to ToR switch T2, as represented by an arrow 102. Upon receipt of the NA response message, the ToR switch T1 syncs the response to ToR switch T2, as represented by an arrow 104, causing ToR switch to set a sync flag in connection with ToR switch T2's cache entry for host H1. The sync flag is used to differentiate between a directly learned entry and a synced entry. The result of this mechanism is to avoid traffic black holes caused by deleting of cache entries for live nodes, as illustrated in FIG. 5A.

Figure 6:
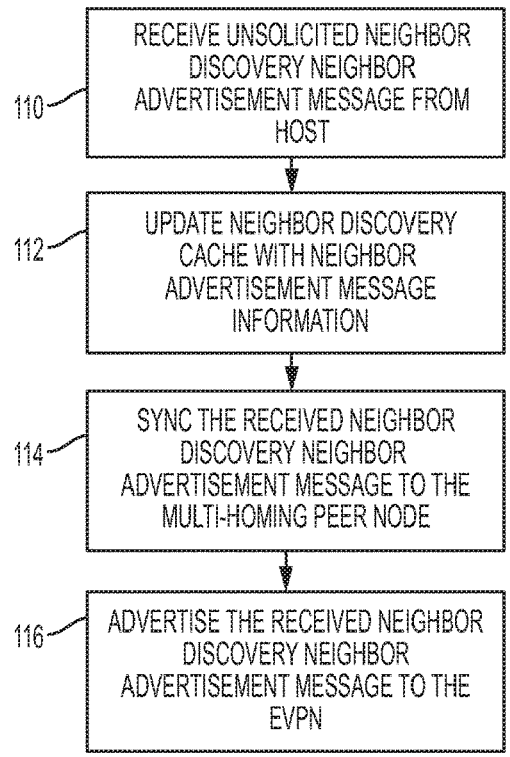
FIG. 6 is a flowchart illustrating steps of a method that may be implemented by a network node of a data communications environment including features of embodiments described herein for optimizing EVPN-IRB for IPv6-enabled data centers with ToR deployments.

FIG. 6 is a flowchart illustrating steps of a method that may be implemented by a network node of a data communications environment including features of embodiments described herein for optimizing EVPN-IRB for IPv6-enabled data centers with ToR deployments. In step 110, an unsolicited NA message is received by one ToR switch of a multi-homed pair of peer ToR switches. In step 112, the ToR switch that received the unsolicited NA message updates its ND cache with the information included in the NA message. In step 114, the ToR switch that received the unsolicited NA message syncs the information to its peer ToR switch, which uses the information to update its own ND cache. In step 116, the ToR switch that received the unsolicited NA message advertises the message to the EVPN.

In example implementations, at least some portions of the activities related to the techniques described herein may be implemented in software in, for example, a server, a router, etc. In some embodiments, this software could be received or downloaded from a web server, provided on computer-readable media, or configured by a manufacturer of a particular element in order to provide this system in accordance with features of embodiments described herein. In some embodiments, one or more of these features may be implemented in hardware, provided external to these elements, or consolidated in any appropriate manner to achieve the intended functionality.

Figure 7:
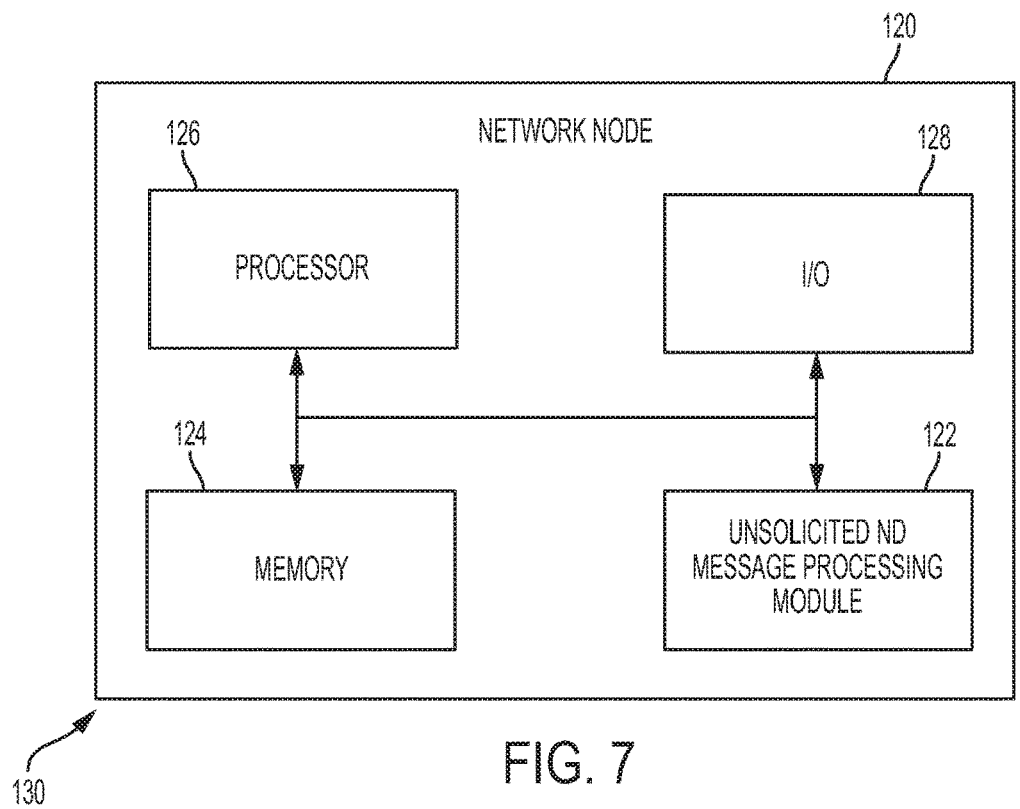
FIG. 7 is a simplified block diagram of a network node of a data communications environment including features of embodiments described herein for optimizing EVPN-IRB for IPv6-enabled data centers with ToR deployments.

For example, referring to FIG. 7, a network node, or element, 120, which may be implemented as a ToR switch, such as one of ToR switches T1-T4, may include an unsolicited ND message processing module 122 comprising software embodied in one or more tangible media for facilitating the activities described herein. In particular, the module 122 may comprise software for facilitating the processes illustrated in and described with reference to FIG. 6, the node 120 may also include a memory device 124 for storing information to be used in achieving the functions as outlined herein. Additionally, the node 120 may include a processor 126 that is capable of executing software or an algorithm (such as embodied in module 122) to perform the functions as discussed in this Specification. The node 120 may also include various I/O 128 necessary for performing functions described herein. It will be recognized that the node 120 of FIG. 7 may be implemented using one or more computer devices comprising software embodied in one or more tangible media for facilitating the activities described herein. The computer device for implementing the transmitter and receiver elements may also include a memory device (or memory element) for storing information to be used in achieving the functions as outlined herein. Additionally, the computer device for implementing the transmitter and receiver elements may include a processor that is capable of executing software or an algorithm to perform the functions as discussed in this Specification, including but not limited to the functions illustrated in and described with reference to FIG. 6. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that in certain example implementations, the functions outlined herein and specifically illustrated in FIG. 6 may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element can store data used for the operations described herein. This includes the memory element being able to store software, logic, code, or processor instructions that are executed to carry out the activities described in this Specification, including but not limited to the functions illustrated in and described with reference to FIG. 6. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

It should be noted that much of the infrastructure discussed herein can be provisioned as part of any type of network element. As used herein, the term "network element" or "network device" can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices can include software to achieve (or to foster) the management activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Figure 8:
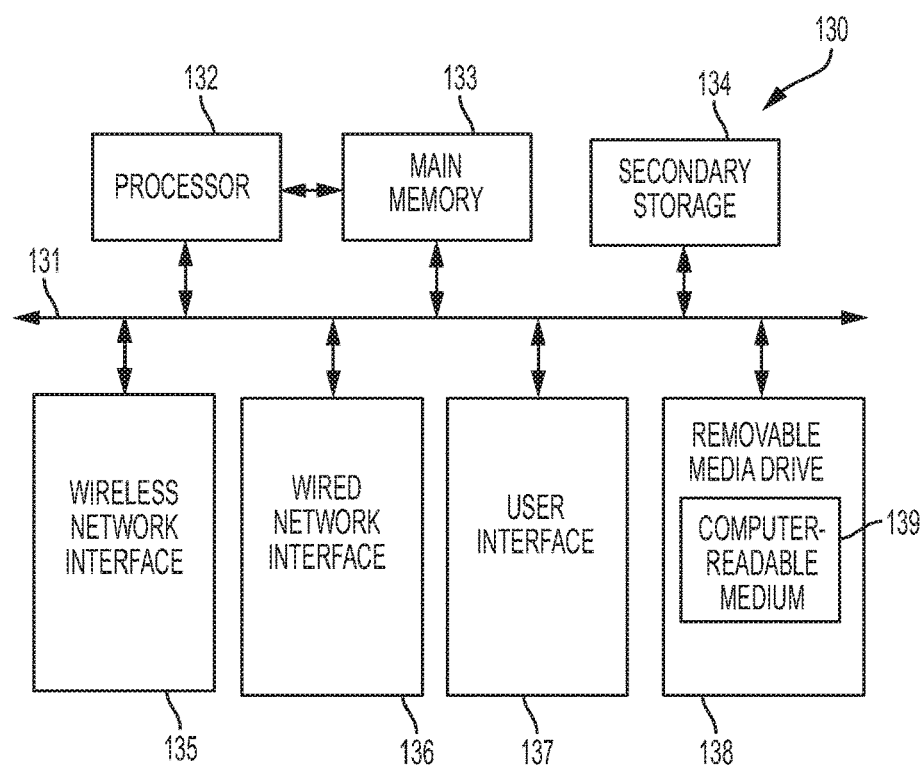
FIG. 8 is a simplified block diagram of a machine comprising a network node of a data communications environment including features of embodiments described herein for optimizing EVPN-IRB for IPv6-enabled data centers with ToR deployments.

Turning to FIG. 8, FIG. 8 illustrates a simplified block diagram of an example machine (or apparatus) 130, which in certain embodiments may be a ToR switch, such as ToR switches T1-T4, that may be implemented in embodiments described herein. The example machine 130 corresponds to network elements and computing devices that may be deployed in a communications network, such as a classifier or a forwarding element. In particular, FIG. 8 illustrates a block diagram representation of an example form of a machine within which software and hardware cause machine 130 to perform any one or more of the activities or operations discussed herein. As shown in FIG. 8, machine 130 may include a processor 132, a main memory 133, secondary storage 134, a wireless network interface 135, a wired network interface 136, a user interface 137, and a removable media drive 138 including a computer-readable medium 139. A bus 131, such as a system bus and a memory bus, may provide electronic communication between processor 132 and the memory, drives, interfaces, and other components of machine 130.

Processor 132, which may also be referred to as a central processing unit ("CPU"), can include any general or special-purpose processor capable of executing machine readable instructions and performing operations on data as instructed by the machine readable instructions. Main memory 133 may be directly accessible to processor 132 for accessing machine instructions and may be in the form of random access memory ("RAM") or any type of dynamic storage (e.g., dynamic random access memory ("DRAM")). Secondary storage 134 can be any non-volatile memory such as a hard disk, which is capable of storing electronic data including executable software files. Externally stored electronic data may be provided to computer 130 through one or more removable media drives 138, which may be configured to receive any type of external media such as compact discs ("CDs"), digital video discs ("DVDs"), flash drives, external hard drives, etc.

Wireless and wired network interfaces 135 and 136 can be provided to enable electronic communication between machine 130 and other machines, or nodes. In one example, wireless network interface 135 could include a wireless network controller ("WNIC") with suitable transmitting and receiving components, such as transceivers, for wirelessly communicating within a network. Wired network interface 136 can enable machine 130 to physically connect to a network by a wire line such as an Ethernet cable. Both wireless and wired network interfaces 135 and 136 may be configured to facilitate communications using suitable communication protocols such as, for example, Internet Protocol Suite ("TCP/IP"). Machine 130 is shown with both wireless and wired network interfaces 135 and 136 for illustrative purposes only. While one or more wireless and hardwire interfaces may be provided in machine 130, or externally connected to machine 130, only one connection option is needed to enable connection of machine 130 to a network.

A user interface 137 may be provided in some machines to allow a user to interact with the machine 130. User interface 137 could include a display device such as a graphical display device (e.g., plasma display panel ("PDP"), a liquid crystal display ("LCD"), a cathode ray tube ("CRT"), etc.). In addition, any appropriate input mechanism may also be included such as a keyboard, a touch screen, a mouse, a trackball, voice recognition, touch pad, etc.

Removable media drive 138 represents a drive configured to receive any type of external computer-readable media (e.g., computer-readable medium 139). Instructions embodying the activities or functions described herein may be stored on one or more external computer-readable media. Additionally, such instructions may also, or alternatively, reside at least partially within a memory element (e.g., in main memory 133 or cache memory of processor 132) of machine 130 during execution, or within a non-volatile memory element (e.g., secondary storage 134) of machine 130. Accordingly, other memory elements of machine 130 also constitute computer-readable media. Thus, "computer-readable medium" is meant to include any medium that is capable of storing instructions for execution by machine 130 that cause the machine to perform any one or more of the activities disclosed herein.

Not shown in FIG. 8 is additional hardware that may be suitably coupled to processor 132 and other components in the form of memory management units ("MMU"), additional symmetric multiprocessing ("SMP") elements, physical memory, peripheral component interconnect ("PCI") bus and corresponding bridges, small computer system interface ("SCSI")/integrated drive electronics ("IDE") elements, etc. Machine 130 may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in machine 130 to appropriately manage the operation of the hardware components therein.

The elements, shown and/or described with reference to machine 130, are intended for illustrative purposes and are not meant to imply architectural limitations of machines such as those utilized in accordance with the present disclosure. In addition, each machine may include more or fewer components where appropriate and based on particular needs. As used in this Specification, the term "machine" is meant to encompass any computing device or network element such as servers, routers, personal computers, client computers, network appliances, switches, bridges, gateways, processors, load balancers, wireless LAN controllers, firewalls, or any other suitable device, component, element, or object operable to affect or process electronic information in a network environment.

In example implementations, at least some portions of the activities described herein may be implemented in software in. In some embodiments, this software could be received or downloaded from a web server, provided on computer-readable media, or configured by a manufacturer of a particular element in order to implement the embodiments described herein. In some embodiments, one or more of these features may be implemented in hardware, provided external to these elements, or consolidated in any appropriate manner to achieve the intended functionality.

In one example implementation, classifier and forwarding elements, which may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

Furthermore, in the embodiments described and illustrated herein, some of the processors and memory elements associated with the various network elements may be removed, or otherwise consolidated such that a single processor and a single memory location are responsible for certain activities. Alternatively, certain processing functions could be separated and separate processors and/or physical machines could implement various functionalities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory elements (e.g., main memory 133, secondary storage 134, computer-readable medium 139) can store data used in implementing embodiments described and illustrated herein. This includes at least some of the memory elements being able to store instructions (e.g., software, logic, code, etc.) that are executed to carry out the activities described in this Specification. A processor can execute any type of instructions associated with the data to achieve the operations detailed herein in this Specification. In one example, one or more processors (e.g., processor 132) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable read only memory ("EEPROM"), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components of communications network described herein may keep information in any suitable type of memory (e.g., random access memory ("RAM"), read-only memory ("ROM"), erasable programmable ROM ("EPROM"), electrically erasable programmable ROM ("EEPROM"), etc.), software, hardware, or in any other suitable component, device, element, or object where appropriate and based on particular needs. Any of the memory items discussed herein should be construed as being encompassed within the broad term "memory element." The information being read, used, tracked, sent, transmitted, communicated, or received by network environment, could be provided in any database, register, queue, table, cache, control list, or other storage structure, all of which can be referenced at any suitable timeframe. Any such storage options may be included within the broad term "memory element" as used herein. Similarly, any of the potential processing elements and modules described in this Specification should be construed as being encompassed within the broad term "processor."

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to myriad other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 142 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   receiving at a network node of an Ethernet Virtual Private Network ("EVPN") an unsolicited neighbor discovery ("ND") neighbor advertisement ("NA") message transmitted on behalf of a host;
   updating an ND cache of the network node with data included in the unsolicited ND NA message;
   syncing the received unsolicited ND NA message to a multihoming peer node of the network node, wherein the syncing comprises adding to an ND cache of the multihoming peer node an entry corresponding to the host with a sync flag set; and
   advertising by the network node the unsolicited ND NA message to other nodes in the EVPN.

2. The method of claim 1, wherein the network node comprises a Top of Rack ("ToR") switch.

3. The method of claim 1, wherein the data included in the unsolicited ND NA message comprises IP to MAC binding information for the host.

4. The method of claim 1, wherein the updating comprises updating an entry in the ND cache corresponding to the host.

5. The method of claim 1, wherein the unsolicited ND NA message is originated by the host during an initiation process of the host in connection with the EVPN.

6. The method of claim 1, wherein the unsolicited ND NA message is originated by the host in response to receipt of an ND Neighbor Solicitation ("NS") message to the host on behalf of another host in a stretched subnet to which the host belongs.

7. The method of claim 1, wherein the unsolicited ND NA message is originated by the host in response to receipt of an ND Neighbor Solicitation ("NS") message received from the multihoming peer node of the network node.

8. The method of claim 1, wherein the sync flag differentiates the entry as being synced instead of being learned.

9. One or more non-transitory tangible media that includes code for execution and when executed by a processor is operable to perform operations comprising:
   receiving at a network node of an Ethernet Virtual Private Network ("EVPN") an unsolicited neighbor discovery ("ND") neighbor advertisement ("NA") message transmitted on behalf of a host;
   updating an ND cache of the network node with data included in the unsolicited ND NA message;
   syncing the received unsolicited ND NA message to a multihoming peer node of the network node, wherein the syncing comprises adding to an ND cache of the multihoming peer node an entry corresponding to the host with a sync flag set; and
   advertising by the network node the unsolicited ND NA message to other nodes in the EVPN.

10. The media of claim 9, wherein the data included in the unsolicited ND NA message comprises IP to MAC binding information for the host and wherein the updating comprises updating an entry in the ND cache corresponding to the host.

11. The media of claim 9, wherein the unsolicited ND NA message is originated by the host during an initiation process of the host in connection with the EVPN.

12. The media of claim 9, wherein the unsolicited ND NA message is originated by the host in response to receipt of an ND Neighbor Solicitation ("NS") message to the host on behalf of another host in a stretched subnet to which the host belongs.

13. The media of claim 9, wherein the unsolicited ND NA message is originated by the host in response to receipt of an ND Neighbor Solicitation ("NS") message received from the multihoming peer node of the network node.

14. The media of claim 9, wherein the sync flag differentiates the entry as being synced instead of being learned.

15. An apparatus comprising:
   a memory element configured to store data; and
   a processor operable to execute instructions associated with the data; the apparatus configured for:
      receiving at a network node of an Ethernet Virtual Private Network ("EVPN") an unsolicited neighbor discovery ("ND") neighbor advertisement ("NA") message transmitted on behalf of a host;
      updating an ND cache of the network node with data included in the unsolicited ND NA message;
      syncing the received unsolicited ND NA message to a multihoming peer node of the network node, wherein the syncing comprises adding to an ND cache of the multihoming peer node an entry corresponding to the host with a sync flag set; and
      advertising by the network node the unsolicited ND NA message to other nodes in the EVPN.

16. The apparatus of claim 15, wherein the data included in the unsolicited ND NA message comprises IP to MAC binding information for the host and wherein the updating comprises updating an entry in the ND cache corresponding to the host.

17. The apparatus of claim 15, wherein the unsolicited ND NA message is originated by the host during an initiation process of the host in connection with the EVPN.

18. The apparatus of claim 15, wherein the unsolicited ND NA message is originated by the host in response to receipt of an ND Neighbor Solicitation ("NS") message to the host on behalf of another host in a stretched subnet to which the host belongs.

19. The apparatus of claim 15, wherein the unsolicited ND NA message is originated by the host in response to receipt of an ND Neighbor Solicitation ("NS") message received from the multihoming peer node of the network node.

20. The apparatus of claim 15, wherein the sync flag differentiates the entry as being synced instead of being learned.

* * * * *